(12) United States Patent
Li et al.

(10) Patent No.: US 7,860,334 B2
(45) Date of Patent: Dec. 28, 2010

(54) ADAPTIVE IMAGE FILTER FOR FILTERING IMAGE INFORMATION

(75) Inventors: Hsiang-Tsun Li, San Diego, CA (US); Szepo Robert Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1319 days.

(21) Appl. No.: 11/352,483

(22) Filed: Feb. 9, 2006

(65) Prior Publication Data

US 2007/0183681 A1 Aug. 9, 2007

(51) Int. Cl.
*G06K 9/40* (2006.01)
(52) U.S. Cl. ........................ 382/261; 382/260
(58) Field of Classification Search .................. 382/260
See application file for complete search history.

(56) References Cited

U.S. PATENT DOCUMENTS

| | | | | |
|---|---|---|---|---|
| 4,651,211 A * | 3/1987 | Weckenbrock et al. | ...... | 348/702 |
| 5,111,511 A * | 5/1992 | Ishii et al. | .................... | 382/107 |
| 5,206,715 A * | 4/1993 | Jung et al. | ................... | 348/664 |
| 5,481,628 A * | 1/1996 | Ghaderi | ...................... | 382/261 |
| 5,664,029 A * | 9/1997 | Callahan et al. | ............. | 382/260 |
| 5,828,849 A * | 10/1998 | Lempel et al. | .............. | 709/247 |
| 5,854,859 A | 12/1998 | Sobol | | |
| 5,946,454 A * | 8/1999 | Shu et al. | ...................... | 358/1.9 |
| 6,058,220 A * | 5/2000 | Hillen et al. | ................. | 382/263 |
| 6,188,799 B1 * | 2/2001 | Tan et al. | ..................... | 382/260 |
| 6,359,681 B1 * | 3/2002 | Housand et al. | ............ | 356/4.01 |
| 6,545,715 B1 * | 4/2003 | Na | .............................. | 348/351 |
| 6,563,958 B1 * | 5/2003 | Andrew | ....................... | 382/268 |
| 6,658,165 B1 * | 12/2003 | Choi | ........................... | 382/274 |
| 6,856,704 B1 | 2/2005 | Gallagher | | |
| 7,318,079 B2 * | 1/2008 | Hahn | ......................... | 708/300 |
| 7,580,589 B2 * | 8/2009 | Bosco et al. | ................. | 382/275 |
| 7,643,659 B2 * | 1/2010 | Cao et al. | .................... | 382/118 |

(Continued)

FOREIGN PATENT DOCUMENTS

EP 1594087 11/2005

(Continued)

*Primary Examiner*—Vikkram Bali
*Assistant Examiner*—Michelle Entezari
(74) *Attorney, Agent, or Firm*—Timothy F. Loomis; James R. Gambale JR (57) ABSTRACT

This disclosure describes adaptive filtering techniques to improve the quality of captured imagery, such as video or still images. In particular, this disclosure describes adaptive filtering techniques that filter each pixel as a function of a set of surrounding pixels. An adaptive image filter may compare image information associated with a pixel of interest to image information associated with a set of surrounding pixels by, for example, computing differences between the image information associated with the pixel of interest and each of the surrounding pixels of the set. The computed differences can be used in a variety of ways to filter image information of the pixel of interest. In some embodiments, for example, the adaptive image filter may include both a low pass component and high pass component that adjust as a function of the computed differences.

33 Claims, 5 Drawing Sheets

U.S. PATENT DOCUMENTS

| | | | |
|---|---|---|---|
| 7,649,652 B2* | 1/2010 | Lee et al. | 358/1.9 |
| 7,680,355 B2* | 3/2010 | Chiu et al. | 382/266 |
| 7,697,775 B2* | 4/2010 | Shiraki et al. | 382/254 |
| 2002/0080283 A1* | 6/2002 | Hahn et al. | 348/700 |
| 2005/0012866 A1* | 1/2005 | Chiang et al. | 348/625 |
| 2005/0152614 A1* | 7/2005 | Daly et al. | 382/268 |
| 2005/0259886 A1 | 11/2005 | Shan | |
| 2006/0061669 A1* | 3/2006 | Jang et al. | 348/226.1 |
| 2006/0119738 A1* | 6/2006 | Kido | 348/571 |
| 2007/0165962 A1* | 7/2007 | Smirnov et al. | 382/260 |

OTHER PUBLICATIONS

Written Opinion—PCT/US07/061869, International Search Authority—European Patent Office, Nov. 7, 2007.

International Preliminary Report on Patentability—PCT/US07/061869, International Bureau of WIPO—Geneva, Switzerland, Aug. 21, 2008.

* cited by examiner

ADAPTIVE IMAGE FILTER FOR FILTERING IMAGE INFORMATION

TECHNICAL FIELD

This disclosure relates to image capture devices and, more particularly, filtering of image information within image capture devices.

BACKGROUND

Image information captured by image capture devices, such as digital video cameras or digital still photo cameras, are susceptible to corruption or noise as a result of physical limitations of the image sensors, interference from illumination sources, and the like. With the increased demand for smaller image capture devices comes the need for more compact image sensor modules. The decrease in the size of image sensor modules results in a significant increase in the amount of noise captured within the image information.

Image information filtering is a common process used for removing such corruption and noise, and improving the quality of a rendered image. Application of low pass filtering to captured image information reduces the amount of noise in the image, but also tends to blur the image by destroying sharp edges containing high frequency signals. Application of high pass filtering to captured image data enhances sharp edges and contrast, but inevitably enhances the noise as well.

SUMMARY

This disclosure describes adaptive filtering techniques to improve the quality of captured imagery, such as video or still images. In particular, this disclosure describes adaptive filtering techniques that filter each pixel as a function of a set of surrounding pixels. For example, an adaptive image filter compares image information associated with a pixel of interest to image information associated with a set of surrounding pixels. The adaptive image filter computes differences between the image information associated with the pixel of interest and the image information associated with each of the surrounding pixels. The adaptive image filter may, for instance, subtract an intensity value of each of the surrounding pixels from an intensity value of the pixel of interest to obtain difference values.

The adaptive image filter filters the image information of the pixel of interest as a function of the computed differences. The adaptive image filter may, for example, compute a low pass component and high pass component of the filter by comparing each of the computed differences to a low pass and high pass threshold value, and summing computed differences that satisfy the threshold requirements. The adaptive image filter then filters the image information associated with the pixel of interest by computing a new pixel value based on the original pixel value, the low pass component of the filter and the high pass component of the filter.

The adaptive image filter may filter each pixel of the image in this manner. Thus, the image filter adjusts the image information on a pixel-by-pixel basis such that each pixel is filtered as a function of its surrounding pixels. Consequently, the low pass component and high pass component of the adaptive image filter adaptively change for each pixel based on the comparison between image information associated with the pixel of interest and the image information associated with the set of surrounding pixels.

In one embodiment, the disclosure provides a method comprising computing differences between image information associated with a pixel of interest and image information associated with pixels that surround the pixel of interest, determining a low pass component and a high pass component of a filter as a function of the computed differences, and applying the filter to the image information associated with the pixel of interest.

In another embodiment, the disclosure provides a device comprising an image sensor array that captures image information, wherein the image sensor array includes a plurality of image sensors that capture image information associated with a plurality of pixels, and an adaptive image filter that computes differences between image information associated with a pixel of interest and image information associated with pixels that surround the pixel of interest, determines a low pass component and a high pass component of a filter as a function of the computed differences, and applies the filter to the image information associated with the pixel of interest.

In an additional embodiment, the disclosure provides a method comprising capturing image information for a plurality of pixels, wherein the image information associated with each of the pixels represents one of a plurality of colors, selecting a pixel of interest and a set of surrounding pixels from the plurality of pixels, wherein the image information associated with the set of surrounding pixels and the pixel of interest represents the same color, computing differences between image information associated with the pixel of interest and image information associated with each of the surrounding pixels of the set, and filtering the image information associated with the pixel of interest as a function of the computed differences.

In a further embodiment, the disclosure provides a device comprising an image sensor array with a plurality of image sensors that capture image information associated with a plurality of pixels, wherein the image information associated with each of the pixels represents one of a plurality of colors, and an adaptive image filter that selects a pixel of interest and a set of surrounding pixels from the plurality of pixels, computes differences between image information associated with the pixel of interest and image information associated with each of the surrounding pixels of the set, and filters the image information associated with the pixel of interest as a function of the computed differences, wherein the image information associated with the set of surrounding pixels and the pixel of interest represents the same color.

In another embodiment, the disclosure provides a computer-readable medium comprising instructions to cause a processor to compute differences between image information associated with a pixel of interest and image information associated with pixels that surround the pixel of interest, determine a low pass component and a high pass component of a filter as a function of the computed differences, and apply the filter to the image information associated with the pixel of interest.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
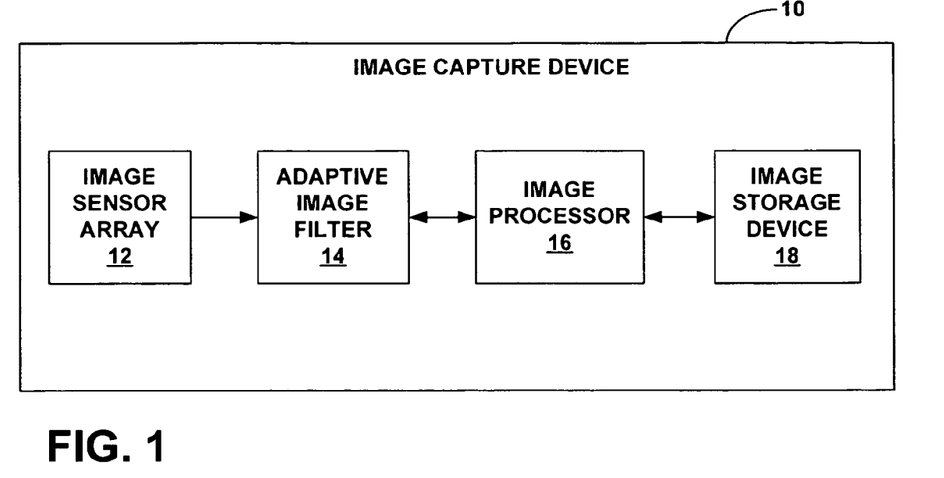
FIG. 1 is a block diagram illustrating an exemplary image capture device for capturing image information.

FIG. 1 is a block diagram illustrating an exemplary image capture device 10 for capturing image information. As shown in FIG. 1, image capture device 10 includes an image sensor array 12, an adaptive image filter 14, an image processor 16, and an image storage device 18. The features illustrated in FIG. 1 may be realized by any suitable combination of hardware and/or software components. Depiction of different features as units is intended to highlight different functional aspects of image capture device 10, and does not necessarily imply that such units must be realized by separate hardware and/or software components. Rather, functionality associated with one or more units may be integrated within common hardware and/or software components.

Image capture device 10 may be a digital camera, such as a digital video camera, a digital still image camera, or a combination of both. In addition, image capture device 10 may be a stand-alone device, such as a stand-alone camera, or be integrated in another device, such as a wireless communication device. As an example, image capture device 10 may be integrated in a mobile telephone to form a so-called camera phone or video phone. Image capture device 10 preferably is equipped to capture color imagery, black-and-white imagery, or both. In this disclosure, the terms "image," "imagery," "image information," or similar terms may interchangeably refer to either video or still pictures.

Image sensor array 12 acquires image information for a scene of interest. Image sensor array 12 includes a two-dimensional array of individual image sensors, e.g., arranged in rows and columns. Each of the image sensors of image sensor array 12 may be associated with a single pixel. In other words, there may be a one-to-one correspondence between image sensors and pixels. In some embodiments, however, there may be more than one image sensor associated with each pixel. Image sensor array 12 may comprise, for example, an array of solid state sensors such as complementary metal-oxide semiconductor (CMOS) sensors, charge coupled device (CCD) sensors or the like.

Image sensor array 12 may also include a two-dimensional array of color filters that cover the image sensors of array 12 to separate out the color components of the scene of interest. Image sensor array 12 may comprise, for example, an array of red, green and blue filters arranged in a Bayer pattern, i.e., a repeating arrangement of color filters that alternates rows of alternating red and green color filters, and alternating blue and green color filters (see FIGS. 5A and 5B). Image sensor array 12 may utilize other color filters, such as CMYK color filters. Additionally, image sensor array 12 may arrange the color filters into patterns other than the Bayer pattern.

The image sensors within image sensor array 12 are exposed to the image scene to capture image information. Each of the image sensors of array 12 may, for example, capture an intensity value representing the intensity of the light of the scene. Each of the image sensors of sensor array 12 may only be sensitive to one color due to the color filters covering the sensors. Thus, each the image sensors of sensor array 12 capture image information (e.g., intensity values) for only one of the three colors. In the case of the Bayer pattern described above, half of the image sensors capture image information representing the color green, one-quarter of the image sensors capture image information representing the color blue, and one-quarter of the image sensors capture image information representing the color red. Consequently, the image information associated with each pixel represents only a portion of the color spectrum. In this disclosure, the term "Bayer format" data refers to image information that represents only a single color.

Adaptive image filter 14 filters the image information captured by image sensor array 12. Adaptive image filter 14 filters the image information associated with each pixel as a function of the image information associated with surrounding pixels. More specifically, adaptive image filter 14 compares the image information associated with a pixel of interest to the image information associated with a set of surrounding pixels, and filters the image information of the pixel of interest as a function of this comparison. Adaptive image filter 14 may, for example, include a low pass component and a high pass component that are adjustable as a function of the comparison between the image information associated with the pixel of interest and the image information associated with the set of surrounding pixels. In this manner, adaptive image filter 14 may smooth out the noise and enhance the image at the same time.

Adaptive image filter 14 filters the image information on a pixel-by-pixel basis, adaptively changing for each pixel based on the comparison between image information associated with the pixel of interest and the image information associated with the set of surrounding pixels. Thus, the filter applied to image information of a first pixel of interest may vary from the filter applied to image information of a second pixel of interest.

Adaptive image filter 14 may filter the image information that represents only a single color (i.e., Bayer format data). In other words, adaptive image filter 14 may filter the image information captured by each image sensor as a function of image information captured by surrounding image sensors utilizing the same color filter. For example, adaptive filter 14 filters the image information captured by an image sensor utilizing a blue color filter as a function of the surrounding image sensors that also utilize blue color filters. Alternatively, adaptive image filter 14 may filter the image information after interpolating the image information into the RGB (red, green, blue) domain or conversion from the RGB domain to the YCbCr (luminance, blue chrominance, red chrominance) domain.

Image processor 16 receives the filtered image information from adaptive image filter 14 and performs any necessary processing on the filtered image information. Image processor 16 may, for example, perform cropping, compression, image enhancement, or other processing of the image information captured by image sensor array 12. Image processor 16 may be realized by a microprocessor, digital signal processor (DSP), application specification integrated circuit (ASIC), field programmable gate array (FPGA), or any other equivalent discrete or integrated logic circuitry. In some embodiments, image processor 16 may form part of an encoder-decoder (CODEC) that encodes the image information according to a particular encoding technique or format, such as MPEG-2, MPEG-4, ITU H.263, ITU H.264, JPEG, or the like.

Image processor 16 stores the image information in image storage device 18. Image processor 16 may store raw image information, processed image information, or encoded information in image storage device 18. If the image information is accompanied by audio information, the audio also may be stored in image storage device 18, either independently or in conjunction with the video information. Image storage device 18 may comprise any volatile or non-volatile memory or storage device, such as read-only memory (ROM), electrically erasable programmable read-only memory (EEPROM), or FLASH memory, or such as a magnetic data storage device or optical data storage device.

Figure 2:
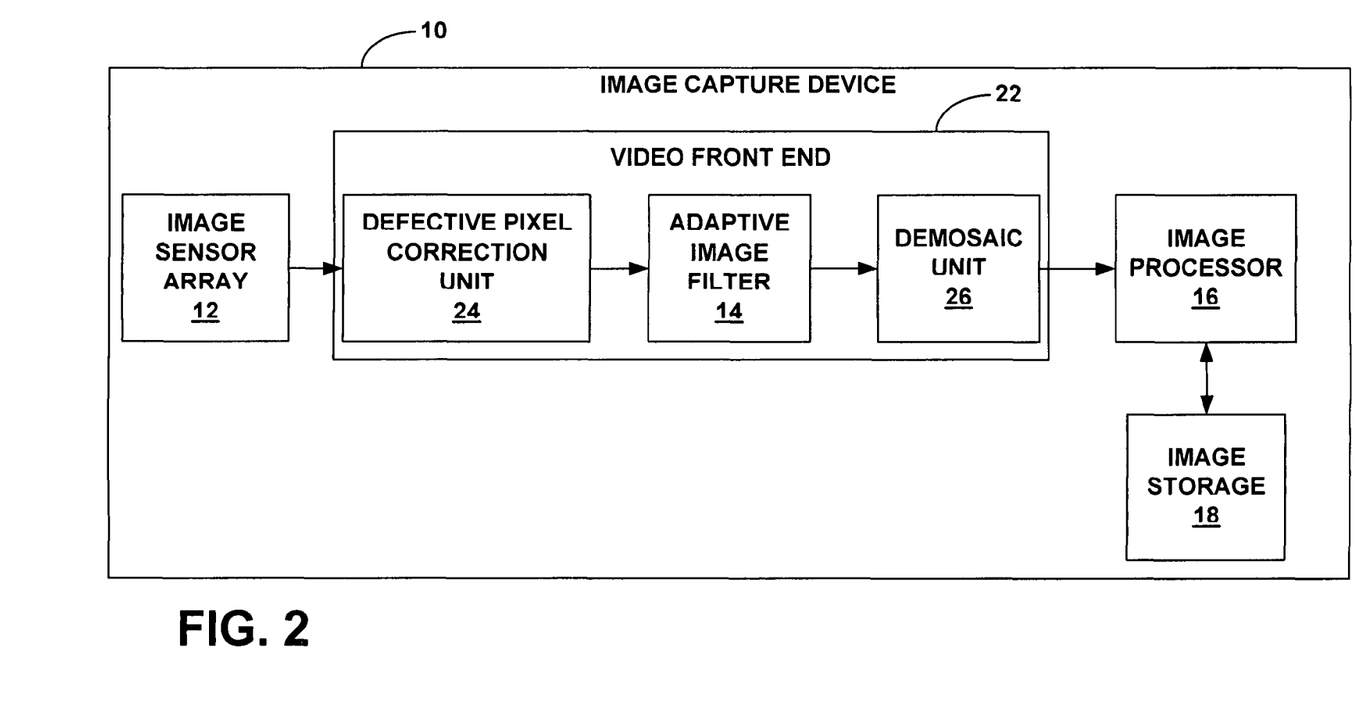
FIG. 2 is a block diagram illustrating the image capture device of FIG. 1 in further detail.

FIG. 2 is a block diagram illustrating image capture device 10 in further detail. Image capture device 10 incorporates adaptive image filter 14 into a video front end (VFE) 22 that performs image processing operations on the raw image information from image sensor array 12. As illustrated in FIG. 2, VFE 22 includes a defective pixel correction unit 24, adaptive image filter 14 and a demosaic unit 26. Defective pixel correction unit 24 corrects image information associated with one or more defective pixels. In other words, defective pixel correction unit 24 corrects image information captured by one or more defective image sensors.

Defective pixel correction unit 24 may, for example, correct image information captured by image sensors that are locked at either a dark or bright intensity level. Defective pixel correction unit 24 buffers image information captured by image sensor array 12, identifies image information associated with defective pixels, and corrects the image information associated with the defective pixels. Defective pixel correction unit 24 may, for example, replace the buffered image information associated with the defective pixels with image information interpolated as a function of image information associated with surrounding pixels.

Adaptive image filter 14 uses the image information buffered by defective pixel correction unit 24 to filter the image information associated with each pixel as a function of the image information associated with surrounding pixels. By using the image information buffered by defective pixel correction unit 24, adaptive image filter 14 reduces the amount of memory needed for buffering the image information.

Demosaic unit 26 interpolates the missing color values for each pixel. As described above, each of the image sensors of array 12 captures image information representative of only a single color. In other words, the image information associated with each pixel includes only a single color component; either red, green or blue. Demosaic unit 26 interpolates the missing color values for each of the pixels. For example, demosaic unit 26 interpolates the blue and green components for a red pixel. Image information associated with each of the pixels includes values for each color component after processing by demosaic unit 26. In this manner, demosaic unit 26 converts the Bayer format data into the RGB domain. Demosaic unit 26 may interpolate the missing color values for each of the pixels using the image information captured by surrounding pixels. Demosaic unit 26 may use any interpolation method, such as nearest neighbor, linear, cubic, cubic spline, and the like.

The embodiment illustrated in FIG. 2 is for exemplary purposes only. Adaptive image filter 14 need not reside in VFE 22, but instead may reside elsewhere within image capture device 10. As described above, adaptive image filter 14 may filter the image information after interpolation by demosaic unit 24 into the RGB domain or even after conversion from the RGB domain to the YCbCr domain.

Figure 3:
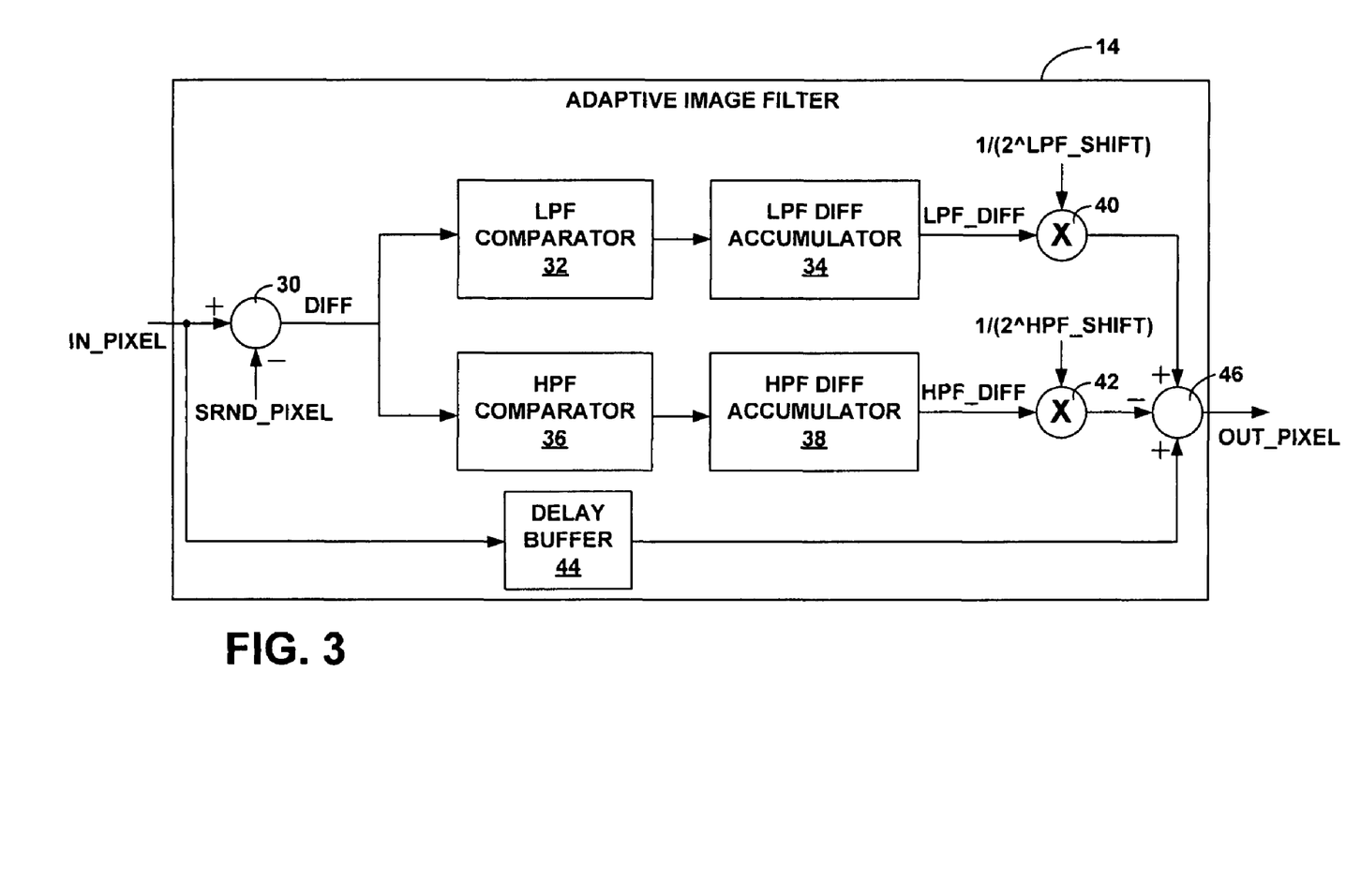
FIG. 3 is a block diagram illustrating an adaptive image filter useful with the image capture device of FIG. 1.

FIG. 3 is a block diagram illustrating adaptive image filter 14 in further detail. Depiction of different features as units is intended to highlight different functional aspects of adaptive image filter 14, and does not necessarily imply that such units must be realized by separate hardware and/or software components. Rather, functionality associated with one or more units may be integrated within common hardware and/or software components.

As described above, adaptive image filter 14 compares the image information associated with a pixel of interest to the image information associated with a set of surrounding pixels, and filters the image information of the pixel of interest as a function of this comparison. In one embodiment, adaptive image filter 14 filters each pixel of interest according to the following equation:

$$x(i, j)' = w_{ij} \cdot \frac{\sum_{m,n}(\delta_{i-m,j-n}(x_{i-m,j-n} - x_{ij}))}{\sum_{m,n} \delta_{i-m,j-n}} + \\ w_{ij}' \cdot \frac{\sum_{m,n}(\delta'_{i-m,j-n}(x_{ij} - x_{i-m,j-n}))}{\sum_{m,n} \delta'_{i-m,j-n}} + x(i, j) \quad (1)$$

where $x(i, j)'$ is the filtered pixel value, $x(i, j)$ is the unfiltered value of the pixel of interest, $w_{ij}$ and $w_{ij}'$ are normalization factors, $x_{ij}$ is the value of the image information associated with pixel at location $(i, j)$, m and n are positional values of the surrounding pixels, and:

$$\delta_{i',j'} = 1 \text{ if } \mathrm{abs}(x_{i-m,j-n} - x_{ij}) < LowPassThreshold$$
$$= 0 \text{ if } \mathrm{abs}(x_{i-m,j-n} - x_{ij}) \geq LowPassThreshold$$
$$\delta'_{i',j'} = 1 \text{ if } \mathrm{abs}(x_{i-m,j-n} - x_{ij}) > HighPassThreshold$$
$$= 0 \text{ if } \mathrm{abs}(x_{i-m,j-n} - x_{ij}) \leq HighPassThreshold$$

where LowPassThreshold is a threshold value applicable to a low pass filter component and HighPassThreshold is a threshold value applicable to a high pass filter component.

Equation (1) above may be simplified for implementation in hardware as:

$$x(i, j)' = \frac{\left(\sum_{m,n}(\delta_{i-m,j-n}(x_{i-m,j-n} - x_{ij})) + \left(\sum_{m,n}(\delta'_{i-m,j-n}(x_{ij} - x_{i-m,j-n}))\right) \cdot 2^k\right)}{8} + x(i, j) \quad (2)$$

where $x(i, j)'$ is the filtered pixel value, $x(i, j)$ is the unfiltered value of the pixel of interest, $k \in [-4,4]$ is an adjustable parameter to control the degree of edge enhancement, and $$\delta_{i',j'} = 1 \text{ if } \mathrm{abs}(x_{i-m,j-n} - x_{ij}) < LowPassThreshold$$
$$= 0 \text{ if } \mathrm{abs}(x_{i-m,j-n} - x_{ij}) \geq LowPassThreshold$$
$$\delta'_{i',j'} = 1 \text{ if } \mathrm{abs}(x_{i-m,j-n} - x_{ij}) > HighPassThreshold$$
$$= 0 \text{ if } \mathrm{abs}(x_{i-m,j-n} - x_{ij}) \leq HighPassThreshold$$

Adaptive image filter 14 of FIG. 3 illustrates one exemplary embodiment for filtering pixels in accordance with Equation (1). Adaptive image filter 14 selects a pixel of interest and identifies a set of surrounding pixels. Adaptive image filter 14 obtains image information associated with the pixel of interest and image information associated with the set of surrounding pixels. Adaptive image filter 14 may obtain the image information from a pixel buffer used for defective pixel correction. Alternatively, adaptive image filter 14 may obtain the image information from image storage device 18. Adaptive image filter 14 may obtain the image information in Bayer format, RGB domain, YCbCr domain or other color domain or format. For exemplary purposes, however, FIG. 3 will be discussed in terms of Bayer format data. Thus, the image information associated with the surrounding pixel is image information obtained by image sensors using the same color filter. In general, the image information may be an intensity value.

As described above, adaptive image filter 14 compares the image information associated with a pixel of interest to the image information associated with the set of surrounding pixels, and filters the image information of the pixel of interest as a function of this comparison. Specifically, adaptive image filter 14 computes the differences (30) between the image information of the pixel of interest and each of the surrounding pixels of the set. For each surrounding pixel, for example, adaptive image filter 14 subtracts an intensity value of the surrounding pixel (labeled "SRND_PIXEL" in FIG. 3) from the intensity value of the pixel of interest (labeled "IN_PIXEL" in FIG. 3) to obtain the difference (labeled "DIFF" in FIG. 3). In the case in which the Bayer format data has been converted to the RGB domain or the YCbCr domain, adaptive image filter 14 may compute the differences using other components of the image information. In the case of YCbCr, for example, adaptive image filter 14 may compute the differences by comparing the Y-luminance values of the pixels.

Adaptive image filter 14 determines a low pass component and a high pass component of the filter as a function of the computed differences. Adaptive image filter 14 may, for example, compare the absolute value of the computed differences to threshold values associated with a high pass and low pass component of adaptive image filter 14. Specifically, low pass filter comparator 32 (labeled "LPF COMPARATOR 32" in FIG. 3) compares the absolute value of each of the computed differences to a low pass threshold. The low pass threshold is a programmable value that depends on image quality requirements selected by a designer or customer and the application. If the absolute value of the computed difference is less than the low pass threshold, low pass filter difference accumulator 34 (labeled "LPF DIFF ACCUMULATOR 34" in FIG. 3) increments a difference value by the value of the computed difference. In this manner, low pass filter difference accumulator 34 sums the computed differences that are less than the low pass threshold to determine a difference value associated with the low pass component (labeled "LPF_DIFF" in FIG. 3).

Likewise, high pass filter comparator 36 (labeled "HPF COMPARATOR 36" in FIG. 3) compares the absolute value of each of the computed differences to a high pass threshold. If the absolute value of the computed difference is greater than the high pass threshold, high pass filter difference accumulator 38 (labeled "HPF DIFF ACCUMULATOR 38" in FIG. 3) increments a difference value by the value of the computed difference. In this manner, high pass filter difference accumulator 38 sums the computed differences that are greater than the high pass threshold to determine a difference value associated with the high pass component (labeled "HPF_DIFF" in FIG. 3).

The difference value associated with the low pass component (LPF_DIFF) and the difference value associated with the high pass component (HPF_DIFF) are multiplied by a shift factor. As illustrated in FIG. 3, adaptive image filter 14 multiplies (40) LPF_DIFF by $1/(2^{LPF\_SHIFT})$ and multiplies (42) HPF_DIFF by $1/(2^{HPF\_SHIFT})$. LPF_SHIFT and HPF_SHIFT are programmable values that depend on the application for which image capture device 10 is being used as well as designer or customer preference for image quality. A designer or customer that prefers a sharper image, for example, may set the value of LPF_SHIFT to a larger value, thus resulting in a smaller low pass component of the filter. The values of LPF_SHIFT and HPF_SHIFT may vary from image to image. LPF_SHIFT and HPF_SHIFT may, for example, be determined based on image texture information. Thus, for image information with a clean, smooth texture, LPF_SHIFT may be set to a smaller value. Alternatively, the operator of image capture device 10 may adjust the values of LPF_SHIFT and HPF_SHIFT by, for example, adjusting an image contrast setting on the image capture device 10.

Adaptive image filter 14 includes a delay buffer 40 to delay the image information associated with the pixel of interest while the image information of the pixel of interest is compared with the image information of the surrounding pixels. In other words, delay buffer 40 delays IN_PIXEL while adaptive image filter 14 computes the differences between the image information of the pixel of interest and the surrounding pixels and determines the low pass and high pass components. As an example, delay buffer 40 may delay the image information associated with the pixel of interest while adaptive image filter 14 compares the image information of the pixel of interest with the image information associated with eight surrounding pixels in the case in which the set of surrounding pixels is a 3×3 matrix of surrounding pixels.

Adaptive image filter 14 calculates a filtered pixel value (labeled "OUT_PIXEL" in FIG. 3) for the pixel of interest as a function of the low pass and high pass components. Specifically, adaptive image filter 14 filters the image information associated with the pixel of interest by adding (46) the low pass component to and subtracting (46) the high pass component from the original image information of the pixel of interest. Thus, in the example illustrated in FIG. 3, the filtered pixel value is calculated according to the equation:

$$OUT\_PIXEL = IN\_PIXEL + (LPF\_DIFF/(2^{LPF\_SHIFT})) - (HPF\_DIFF/(2^{HPF\_SHIFT})),$$

where IN_PIXEL is the original value of the image information associated with the pixel of interest, LPF_DIFF is the value of accumulated differences that are less than the low pass threshold, HPF_DIFF is the value of accumulated differences that are greater than the high pass threshold, and LPF_SHIFT and HPF_SHIFT are programmable values.

Figure 4:
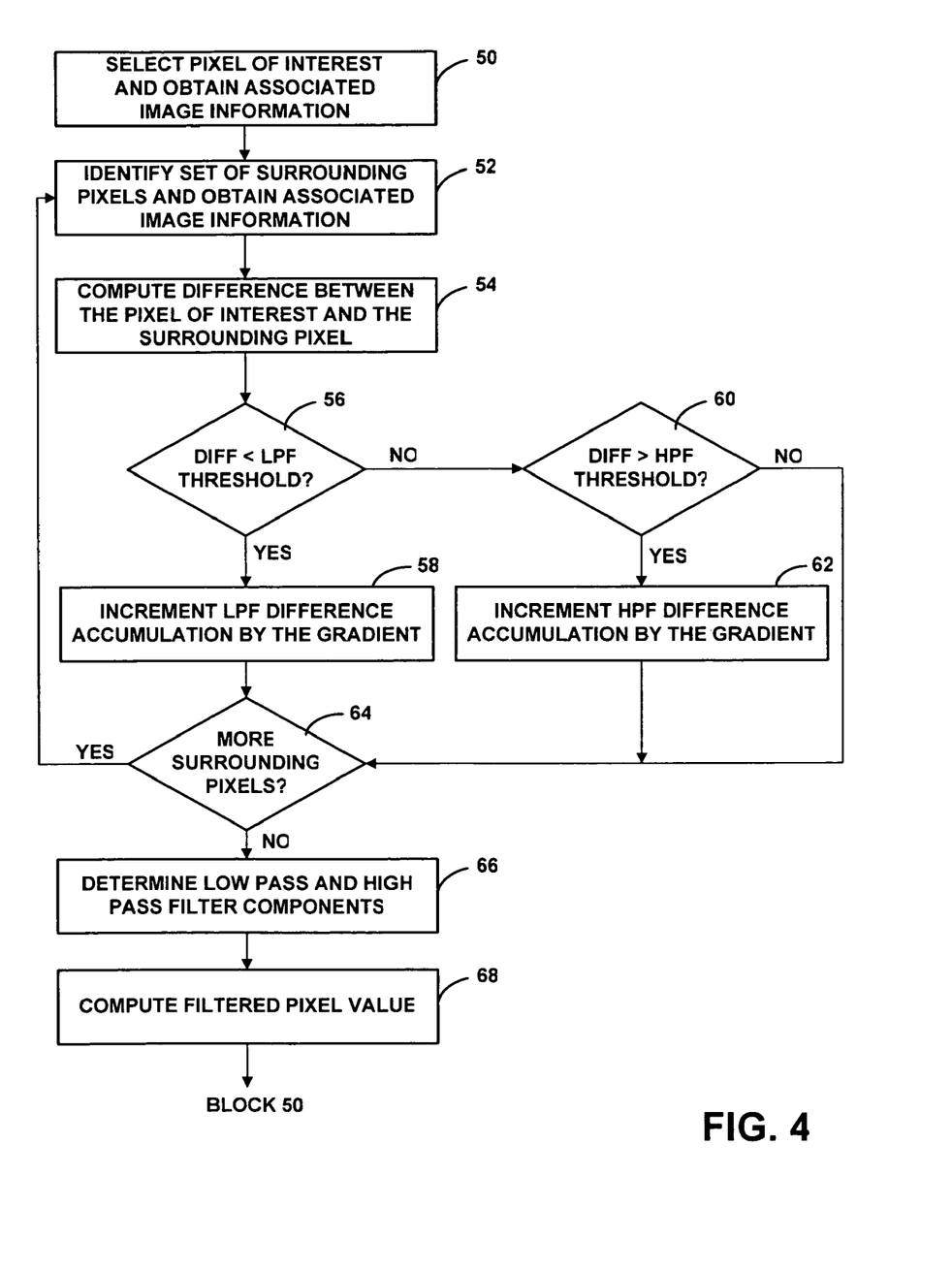
FIG. 4 is a flow diagram illustrating a technique for filtering a pixel of interest as a function of surrounding pixels.

FIG. 4 is a flow diagram illustrating exemplary operation of adaptive image filter 14 of FIG. 1 filtering a pixel of interest as a function of surrounding pixels. Initially, adaptive image filter 14 selects a pixel of interest and obtains image information associated with the pixel of interest (50). Adaptive image filter 14 may, for example, obtain the image information from a pixel buffer used for defective pixel correction. Alternatively, adaptive image filter 14 may obtain the image information from image storage device 18.

Adaptive image filter 14 identifies a set of surround pixels and obtains image information associated with a surrounding pixel (52). Adaptive image filter 14 may again obtain this image information from the buffered pixels used by defective pixel correction unit 24, from image storage device 18 or from some other location. In one embodiment, the image information is associated with a pixel that utilizes the same color filter. Adaptive image filter 14 computes the differences between the image information associated with the pixel of interest and the image information associated with the selected surrounding pixel (54). As described in detail above, adaptive image filter 14 may calculate the difference by subtracting intensity values of the two pixels.

Adaptive image filter 14 compares the computed difference to a low pass threshold (56). If the computed difference is less than the low pass threshold, adaptive image filter 14 increments a difference accumulation (e.g., LPF_DIFF of FIG. 3) by the difference value (58). If the computed difference is greater than or equal to the low pass threshold, adaptive image filter 14 compares the calculated gradient to a high pass threshold (60). If the computed threshold is greater than the high pass threshold, adaptive image filter 14 increments a difference accumulation (e.g., HPF_DIFF of FIG. 3) by the difference value (62).

If the computed difference is less than or equal to the high pass threshold, or after incrementing one of the difference accumulations, adaptive image filter 14 determines whether there are other surrounding pixels of the set to compare (64). If there are other surrounding pixels to compare, adaptive image filter 14 computes the differences between the image information associated with the pixel of interest and the image information of the other surrounding pixels, and compares the differences to the threshold values as described above.

When there are no other surrounding pixels of the set to compare, adaptive image filter 14 determines the low pass and high pass filter components (66). Adaptive image filter 14 determines the values of the filter components as a function of the accumulated differences. For example, the values of the low pass and high pass filter components may be LPF_DIFF/(2^HPF_SHIFT) and HPF_DIFF/(2^HPF_SHIFT), respectively.

Adaptive image filter 14 computes the value of the filtered image information associated with the pixel as a function of the low and high pass filter components (68). For example, the filtered pixel value is calculated according to the equation OUT_PIXEL=IN_PIXEL+(LPF_DIFF/(2^LPF_SHIFT))−(HPF_DIFF/(2^HPF_SHIFT)). Upon computing the filtered pixel value, the process continues for the next pixel of interest. This process continues iteratively until all pixels of interest have been processed.

Figure 5A:
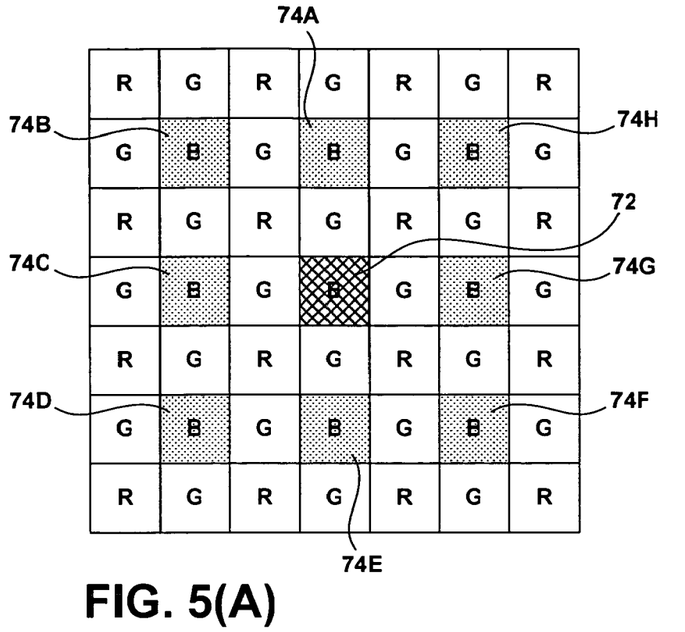
FIGS. 5A and 5B are schematic diagrams illustrating exemplary filtering techniques for filtering a pixel of interest as a function of surrounding pixels.
Figure 5B:
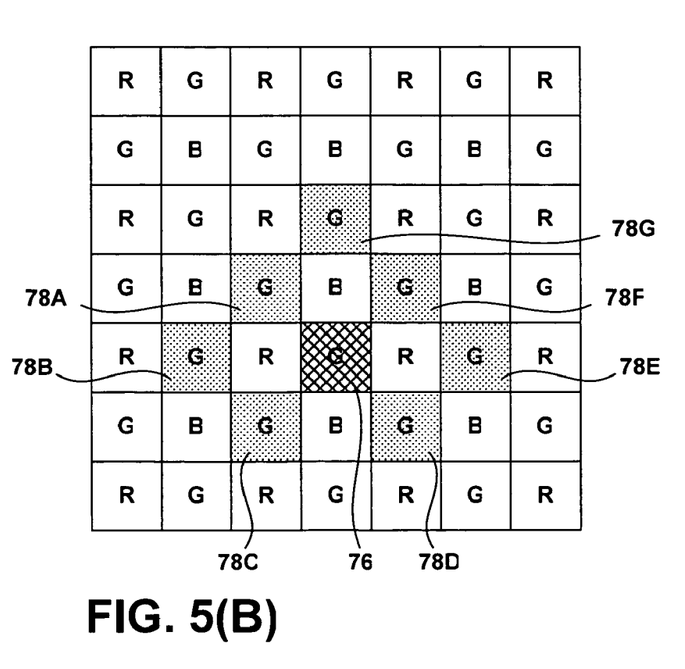

FIGS. 5A and 5B are schematic diagrams illustrating exemplary filtering techniques performed by adaptive image filter 14. FIGS. 5A and 5B show pixels arranged in Bayer format, i.e., each representing only a single color of the possible three colors (R, G, B). In FIGS. 5A and 5B, the boxes labeled "R" represent red pixels, the boxes labeled "B" represent blue pixels and boxes labeled "G" represent green pixels. As described above, each of the pixels may correspond to an image sensor of image sensory array 12. For exemplary purposes only a portion of the pixels associated with image capture device 10 are illustrated in FIGS. 5A and 5B. Typically, image capture device 10 would include many more pixels, likely in the thousands or millions.

FIG. 5A illustrates an exemplary filtering scheme for filtering blue pixels. The same filtering scheme may be used to filter red pixels. FIG. 5B illustrates an exemplary filtering scheme for filtering green pixels. The filtering scheme for filtering the green pixels may be different due to the nature of the Bayer pattern. As described above, there are twice as many green pixels as there are red and blue pixels in the Bayer pattern.

Referring now to FIG. 5A, adaptive image filter 14 selects a pixel of interest 72 and a set of surrounding pixels 74A-H ("surrounding pixels 74"). As illustrated in FIG. 5A, the pixel of interest 72 and surrounding pixels 74 represent the same color, i.e., blue. The same filtering scheme may also be applied to the red pixels. Adaptive image filter 14 computes the difference between image information associated with pixel of interest 72 and image information associated with each of surrounding pixels 74. Thus, in this example, adaptive image filter 14 computes eight differences, i.e., one for each of surrounding pixel 74.

Adaptive image filter 14 filters image information associated with pixel of interest 72 as a function of the computed differences as described above. In particular, adaptive image filter 14 compares the differences to low pass and high pass threshold values, and accumulates low pass and high pass differences when the threshold requirements are met. Adaptive image filter 14 computes the output value of the pixel based on the original value of the image information and the low pass and high pass differences. The following pseudocode illustrates an exemplary algorithm for filtering a blue or red pixel as a function of a 3×3 (three by three) matrix of surrounding pixels:

```
for (m=0;m<=7;m++){
    // for the eight surrounding pixels
    diff [m] = pixel[m] − in_pixel;
    if ( abs(diff[m]) < lpf_threshold){
        // adjust low filtering component of the filter
            lpf_diff += (diff[m]);
    }
    if ( abs(diff[m]) > hpf_threshold){
        // adjust low filtering component of the filter
            hpf_diff += (diff[m]);
    }
}
Out_pixel = in_pixel + (lpf_diff >>LPF_SHIFT) − ( hpf_diff>> HPF_SHIFT)
```

Referring now to FIG. 5B, adaptive image filter 14 selects a pixel of interest 76 and a set of surrounding pixels 78A-G ("surrounding pixels 78"). As illustrated in FIG. 5B, the pixel of interest 76 and surrounding pixels 78 represent the same color, i.e., green. As described above, the filtering algorithm for the green pixels is slightly different due to the larger number of green pixels in the Bayer pattern. Adaptive image filter 14 computes the difference between image information associated with pixel of interest 76 and image information associated with each of surrounding pixels 78, resulting in computation of seven differences for the green pixel of interest 76.

Adaptive image filter 14 filters image information associated with pixel of interest 76 as a function of the computed differences as described above. In particular, adaptive image filter 14 compares the differences to low pass and high pass threshold values, and accumulates low pass and high pass differences when the threshold requirements are met. Adaptive image filter 14 computes the output value of the pixel based on the original value of the image information and the low pass and high pass differences. The following pseudocode illustrates an exemplary algorithm for filtering a green pixel as a function of a 3×3 matrix of surrounding pixels:

```
for (m=0;m<=6;m++){
    // for the seven surrounding pixels
    diff [m] = pixel[m] − in_pixel;
    if ( abs(diff[m]) < lpf_threshold){
```

-continued

```
    // adjust low filtering component of the filter
        lpf_diff += (diff[m]);
    }
    if ( abs(diff[m]) > hpf_threshold){
    // adjust low filtering component of the filter
        hpf_diff += (diff[m]);
    }
}
Out_pixel = in_pixel + (lpf_diff >>LPF_SHIFT) - ( hpf_diff>> HPF_SHIFT)
```

Although the filtering algorithms illustrated in FIGS. 5A and 5B use a 3×3 matrix of surrounding pixels, adaptive image filter 14 may use any number of surrounding pixels. Adaptive image filter 14 may use a larger matrix of surrounding pixels (e.g., a 5×5 matrix or a 7×7 matrix) or only a portion of the pixels of a surrounding matrix. For example, image filter 14 filter pixel of interest 72 as a function of only surrounding pixels 74A, 74C, 74E and 74G (FIG. 5A). Moreover, adaptive image filter 14 may filter image information in different domains, such as image information in the RGB domain or YCbCr domain. In performing filtering in such domains, adaptive image filter 14 may use directly neighboring pixels as the surrounding pixels.

The techniques described herein may be implemented in hardware, software, firmware, or any combination thereof. If implemented in software, the techniques may be directed to a computer-readable medium comprising program code providing machine-executable instructions, that when executed in a device that captures images, performs one or more of the techniques described herein. In that case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a microprocessor or digital signal processor (DSP) may execute instructions stored in memory in order to carry out one or more of the techniques described herein. In some cases, the techniques may be executed by a DSP that invokes various hardware components. In other cases, the techniques described in this disclosure may be implemented by a microprocessor, one or more application specific integrated circuits (ASICs), one or more field programmable gate arrays (FPGAs), or some other hardware-software combination.

Various embodiments have been described. These and other embodiments are within the scope of the following claims.

The invention claimed is:

1. A method comprising:
    computing differences between image information associated with a pixel of interest and image information associated with pixels that surround the pixel of interest by adaptive image filter logic implemented at an electronic device;
    determining a low pass component and a high pass component of a filter with respect to the pixel of interest based on the differences computed by the adaptive image filter logic; and
    applying the filter to the image information associated with the pixel of interest by filtering the image information according to the equation:

$$\text{out\_pixel} = \text{in\_pixel} + \left(\frac{\text{lpf\_diff}}{2^{LPF\_SHIFT}}\right) - \left(\frac{\text{hpf\_diff}}{2^{HPF\_SHIFT}}\right),$$

where out_pixel is a value of the filtered image information, in_pixel is a value of the unfiltered image information, lpf_diff is a sum of computed differences that are less than a low pass threshold, hpf_diff is a sum of computed differences that are greater than a high pass threshold, and LPF_SHIFT and HPF_SHIFT are programmable variables.

2. The method of claim 1, wherein determining the low pass component of the filter comprises:
    comparing each of the computed differences to the low pass threshold;
    summing the computed differences that are less than the low pass threshold to obtain a low pass component value; and
    determining the low pass component based on the low pass component value.

3. The method of claim 1, wherein determining the high pass component of the filter comprises:
    comparing each of the computed differences to the high pass threshold; and
    summing the computed differences that are greater than the high pass threshold to obtain a high pass component value; and
    determining the high pass component based on the high pass component value.

4. The method of claim 1, further comprising:
    buffering image information associated with the pixel of interest and the pixels that surround the pixel of interest; and
    correcting image information associated with one or more defective pixels using the buffered image information, wherein computing the differences between image information associated with the pixel of interest and image information associated with each of the pixels that surround the pixel of interest comprises computing the differences using the buffered image information.

5. The method of claim 1, wherein computing differences between image information associated with the pixel of interest and image information associated with each of the pixels that surround the pixel of interest comprises computing differences in an intensity value associated with the pixel of interest and intensity values associated with the pixels that surround the pixel of interest.

6. The method of claim 1, wherein the image information associated with the pixels that surround the pixel of interest represents only a single color.

7. The method of claim 1, wherein identifying the pixels that surround the pixel of interest comprises identifying an n by n array of pixels that surround the pixel of interest.

8. A device comprising:
    an image sensor array that captures image information, wherein the image sensor array includes a plurality of image sensors that capture image information associated with a plurality of pixels; and
    an adaptive image filter that computes differences between image information associated with a pixel of interest and image information associated with pixels that surround the pixel of interest, determines a low pass component and a high pass component of a filter based on the computed differences, and applies the filter to the image information associated with the pixel of interest according to the equation:

$$out\_pixel = in\_pixel + \left(\frac{lpf\_diff}{2^{LPF\_SHIFT}}\right) - \left(\frac{hpf\_diff}{2^{HPF\_SHIFT}}\right),$$

where out_pixel is a value of the filtered image information, in_pixel is a value of the unfiltered image information, lpf_diff is a sum of computed differences that are less than a low pass threshold, hpf_diff is a sum of computed differences that are greater than a high pass threshold, and LPF_SHIFT and HPF_SHIFT are programmable variables.

9. The device of claim 8, wherein the adaptive image filter compares each of the computed differences to the low pass threshold, sums the computed differences that are less than the low pass threshold to obtain a low pass component value, and determines the low pass component based on the low pass component value.

10. The device of claim 8, wherein the adaptive image filter compares each of the computed differences to the high pass threshold, sums the computed differences that are greater than the high pass threshold to obtain a high pass component value, and determines the high pass component based on the high pass component value.

11. The device of claim 8, further comprising a defective pixel correction unit that buffers image information associated with the pixel of interest and the pixels that surround the pixel of interest, and corrects image information associated with one or more defective pixels using the buffered image information, wherein the adaptive image filter computes the differences using the buffered image information.

12. The device of claim 8, wherein the adaptive image filter computes differences in an intensity value associated with the pixel of interest and intensity values associated with the pixels that surround the pixel of interest.

13. The device of claim 8, wherein the image information associated with the pixels that surround the pixel of interest is in one of the RGB domain and the YCbCr domain.

14. The device of claim 8, wherein the adaptive image filter identifies pixels that utilize a same color filter as the pixels that surround the pixel of interest.

15. A computer-readable medium comprising instructions to cause a processor to:
compute differences between image information associated with a pixel of interest and image information associated with pixels that surround the pixel of interest;
determine a low pass component and a high pass component of a filter based on the computed differences; and
apply the filter to the image information associated with the pixel of interest according to the equation:

$$out\_pixel = in\_pixel + \left(\frac{lpf\_diff}{2^{LPF\_SHIFT}}\right) - \left(\frac{hpf\_diff}{2^{HPF\_SHIFT}}\right),$$

where out_pixel is a value of the filtered image information, in_pixel is a value of the unfiltered image information, lpf_diff is a sum of computed differences that are less than a low pass threshold, hpf_diff is a sum of computed differences that are greater than a high pass threshold, and LPF_SHIFT and HPF_SHIFT are programmable variables.

16. The computer-readable medium of claim 15, wherein the instructions to cause the processor to determine the low pass component of the filter further comprise instructions to cause the processor to:
compare each of the computed differences to the low pass threshold;
sum the computed differences that are less than the low pass threshold to obtain a low pass component value; and
determine the low pass component based on the low pass component value.

17. The computer-readable medium of claim 16, wherein the instructions to cause the processor to determine a high pass component of the filter further comprise instructions to cause the processor to:
compare each of the computed differences to the high pass threshold;
sum the computed differences that are greater than the high pass threshold to obtain a high pass component value; and
determine the high pass component based on the high pass component value.

18. The computer-readable medium of claim 15, wherein the instructions cause the processor to:
buffer image information associated with the pixel of interest and the pixels that surround the pixel of interest; and
correct image information associated with one or more defective pixels using the buffered image information, wherein computing the differences between image information associated with the pixel of interest and image information associated with the pixels that surround the pixel of interest comprises computing the differences using the buffered image information.

19. The computer-readable medium of claim 15, wherein the image information associated with the pixels that surround the pixel of interest is in one of the RGB domain and the YCbCr domain.

20. The computer-readable medium of claim 15, wherein the instructions cause the processor to identify an n by n array of pixels that surround the pixel of interest.

21. The computer-readable medium of claim 15, wherein the pixels that surround the pixel of interest utilize a same color filter.

22. The method of claim 1, wherein applying the filter to the image information associated with the pixel of interest reduces noise and enhaces an image concurrently.

23. The method of claim 1, wherein applying the filter to the image information associated with the pixel of interest comprises modifying a value associated with the pixel of interest by adding the low pass component to the value associated with the pixel of interest and subtracting the high pass component from the value associated with the pixel of interest, wherein the low pass component includes a first scaled sum of computed differences that are less than the low pass threshold and wherein the high pass component includes a second scaled sum of computed differences that are greater than the high pass threshold.

24. The device of claim 8, wherein the adaptive image filter is a single filter that determines the high pass component, determines the low pass component, and applies the high pass component concurrently with applying the low pass component to adjust a value associated with the pixel of interest.

25. The device of claim 8, wherein the low pass component is determined by applying a first scaling factor to a first sum of computed differences that are less than the low pass threshold and wherein the high pass component is determined by applying a second scaling factor to a second sum of computed differences that are greater than the high pass threshold.

26. The computer-readable medium of claim 15, wherein the instructions to determine the low pass component and the high pass component include instructions to cause the processor to:
    perform a first programmable bit shift operation to a first sum of computed differences that are less than the low pass threshold; and
    perform a second programmable bit shift operation to a second sum of computed differences that are greater than the high pass threshold.

27. The computer-readable medium of claim 15, wherein the instructions to apply the filter to the image information associated with the pixel of interest include instructions to apply the high pass component to an intensity value of the pixel of interest concurrently with applying the low pass component to the intensity value of the pixel of interest.

28. A method comprising:
    at an electronic device:
        computing differences between image information associated with a pixel of interest and image information associated with pixels that surround the pixel of interest;
        determining a low pass component and a high pass component of a filter as a function of the computed differences; and
        applying the filter to the image information associated with the pixel of interest, wherein applying the filter to the image information associated with the pixel of interest comprises filtering the image information according to the equation:

$$\text{out\_pixel} = \text{in\_pixel} + \left(\frac{\text{lpf\_diff}}{2^{LPF\_SHIFT}}\right) - \left(\frac{\text{hpf\_diff}}{2^{HPF\_SHIFT}}\right),$$

where out_pixel is a value of the filtered image information, in_pixel is a value of the unfiltered image information, lpf_diff is a sum of computed differences that are less than a low pass threshold, hpf_diff is a sum of computed differences that are greater than a high pass threshold, and LPF_SHIFT and HPF_SHIFT are programmable variables.

29. The method of claim 28, wherein the low pass component and the high pass component are determined by a hardware processor of the electronic device.

30. The method of claim 28, wherein the electronic device further comprises an image sensor array, and wherein the pixel of interest corresponds to an image sensor of the image sensor array.

31. A device comprising:
    an adaptive image filter that computes differences between image information associated with a pixel of interest and image information associated with pixels that surround the pixel of interest, determines a low pass component and a high pass component of a filter as a function of the computed differences, and applies the filter to the image information associated with the pixel of interest according to the equation:

$$\text{out\_pixel} = \text{in\_pixel} + \left(\frac{\text{lpf\_diff}}{2^{LPF\_SHIFT}}\right) - \left(\frac{\text{hpf\_diff}}{2^{HPF\_SHIFT}}\right),$$

where out_pixel is a value of the filtered image information, in_pixel is a value of the unfiltered image information, lpf_diff is a sum of computed differences that are less than a low pass threshold, hpf_diff is a sum of computed differences that are greater than a high pass threshold, and LPF_SHIFT and HPF_SHIFT are programmable variables.

32. The device of claim 31, further comprising:
    an image sensor array configured to capture image information, wherein the image sensor array includes a plurality of image sensors to capture image information associated with a plurality of pixels.

33. The device of claim 31, wherein the adaptive image filter includes:
    an adder having a first input coupled to receive the low pass component, an inverting input coupled to receive the high pass component, and a third input coupled to receive the value of the unfiltered image information, wherein the adder is configured to output the value of the filtered image information.

* * * * *